United States Patent
Kobayashi

(10) Patent No.: US 7,061,835 B2
(45) Date of Patent: Jun. 13, 2006

(54) METHOD AND APPARATUS FOR FOCUS CONTROL OF LENS FOR READING MULTILAYER OPTICAL MEDIUM

(75) Inventor: Toshikazu Kobayashi, Tokyo (JP)

(73) Assignee: Sony Computer Entertainment Inc., Tokyo (JP)

( * ) Notice: Subject to any disclaimer, the term of this patent is extended or adjusted under 35 U.S.C. 154(b) by 147 days.

(21) Appl. No.: 10/001,953

(22) Filed: Oct. 25, 2001

(65) Prior Publication Data
US 2002/0060960 A1    May 23, 2002

(30) Foreign Application Priority Data
Oct. 25, 2000 (JP) ............................. 2000-325990
Oct. 23, 2001 (JP) ............................. 2001-324965

(51) Int. Cl.
*G11B 7/00* (2006.01)
(52) U.S. Cl. .................... 369/44.29; 369/53.28
(58) Field of Classification Search ............. 369/44.27, 369/44.29, 53.28
See application file for complete search history.

(56) References Cited

U.S. PATENT DOCUMENTS

| | | | | |
|---|---|---|---|---|
| 4,740,679 A | * | 4/1988 | Doi | ......................... 250/201.5 |
| 5,481,526 A | * | 1/1996 | Nagata et al. | ........... 369/44.29 |
| 5,841,753 A | * | 11/1998 | Holtslag et al. | ............... 369/94 |
| 6,011,762 A | | 1/2000 | Watanabe et al. | |
| 6,097,688 A | * | 8/2000 | Ichimura et al. | ........ 369/112.24 |
| 6,111,832 A | * | 8/2000 | Tsuchiya et al. | ......... 369/53.23 |
| 6,134,199 A | * | 10/2000 | Ceshkovsky | ............. 369/44.35 |

FOREIGN PATENT DOCUMENTS

| | | |
|---|---|---|
| JP | 61-198432 | 9/1986 |
| JP | 61-198432 | 3/1988 |
| JP | 9-326123 | 12/1997 |

OTHER PUBLICATIONS

Japanese Office Action Dated Oct. 28, 2003.
Chinese Office Action dated Nov. 5, 2004.
River Stone Networks Inc.; http://www.riverstonenet.com/pdf/tls_pres.pdf MPLS based Transparent LAN services. Copyright 2001, no date.

* cited by examiner

Primary Examiner—Gautam R. Patel
(74) Attorney, Agent, or Firm—Katten Muchin Rosenman LLP

(57) ABSTRACT

A pull-in point setting circuit 16 sets the intermediate value between the maximum value and minimum value of the focus error signal of a layer 1 as the pull-in point of a focus servo action in advance of the playback of an optical disk 11. At a layer jump before the automatic adjustment of a focus bias, the focus servo action is pulled in at the set point. Thus, the layer jump can be reliably effected even before the adjustment of the focus bias.

4 Claims, 8 Drawing Sheets

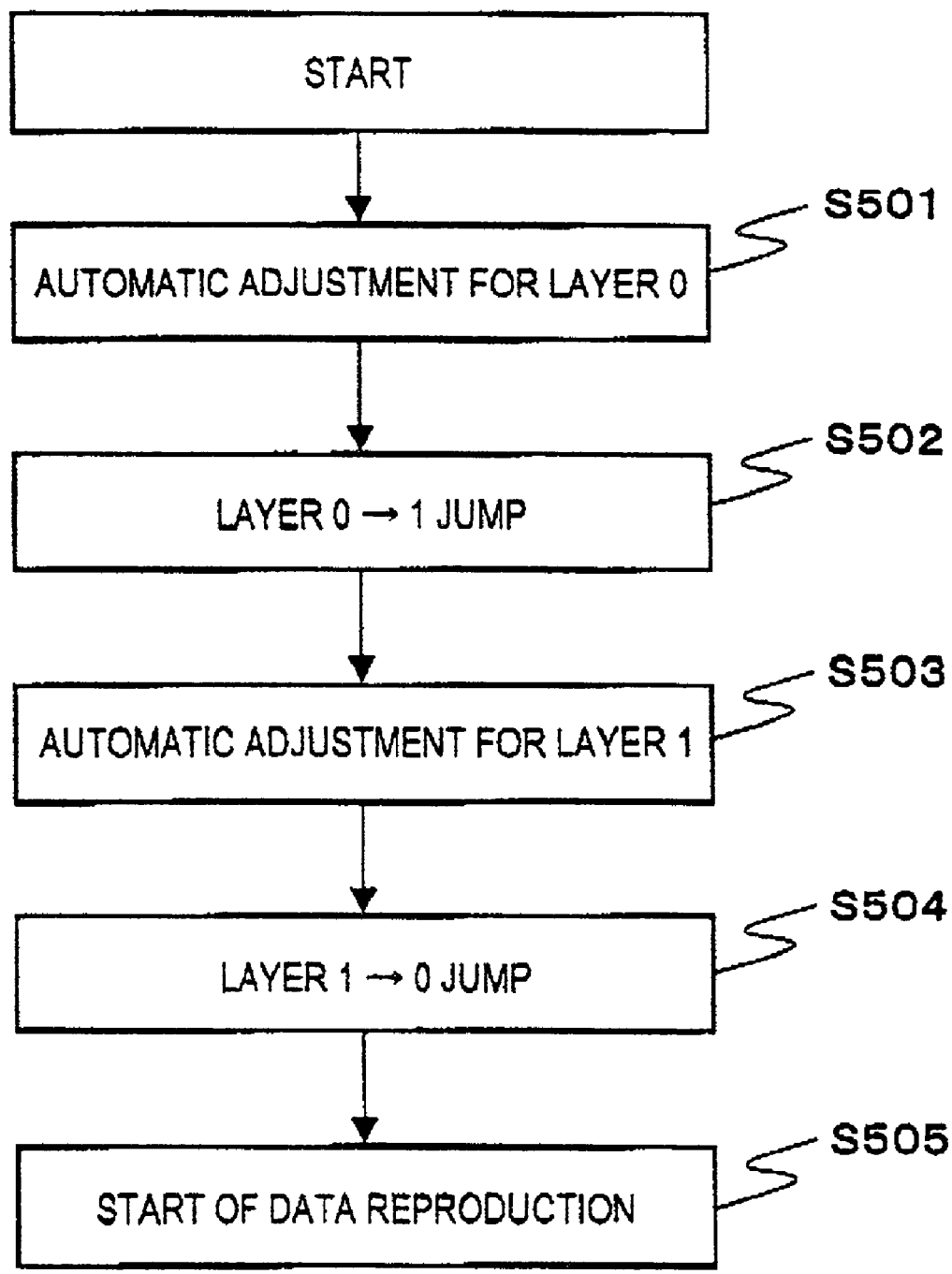

METHOD AND APPARATUS FOR FOCUS CONTROL OF LENS FOR READING MULTILAYER OPTICAL MEDIUM

TECHNICAL FIELD

The present invention relates to a playback apparatus for a multilayer optical recording disk, and more particularly to layer jump control technology for moving an objective lens in a focusing direction in order to perform a focus servo action on any desired recorded layer.

BACKGROUND OF THE INVENTION

In recent years, an optical disk called "DVD" has been put into practical use as a large-capacity recording medium. The DVD has at most two recorded layers per side, and is capable of recording on both its sides. A playback apparatus for such a multilayer optical recording disk is required to include the function (layer jump function) of controlling the distance of an objective lens in a focusing direction relative to the optical disk so that, in a case where, in a state in which a focus servo action is proceeding on any recorded layer under reproduction, a request has been made for the reproduction of another layer, the focus servo action may be performed on the target layer.

Meanwhile, the playback apparatus performs the automatic adjustments of focus biases in the respective layers before reproducing the data of the optical disk, in order that the pull-in of the focus servo action may be effected every disk at a position where the quantity of jitter is minimized to afford the best reproduction characteristics.

More specifically, as shown in a flow chart of FIG. 8, before the data reproduction, the automatic adjustment of a servo is first performed for the lower layer (the layer which is nearer to the objective lens, and which shall be called "layer 0") thereby to set the focus bias of the layer 0 (S501). Subsequently, a layer jump is made for the layer 1 (S502), and the automatic adjustment of the servo is performed for the layer 1, thereby to set the focus bias of the layer 1 (S503).

Besides, a focus jump is made for the layer 0 (S504), and the reproduction of the data is started (S505). Thenceforth, using the set values of the focus biases, differences among individual optical disks can be absorbed to perform reliable layer jumps and pull-in of the focus servo action. Incidentally, although these processes are sometimes preceded by the discrimination of disk media, this process shall be omitted.

DISCLOSURE OF THE INVENTION

Meanwhile, in the above-mentioned automatic adjustment process for the focus biases, the layer jump from the layer 0 to the layer 1 (S502) needs to be made after the automatic adjustment of the focus bias of the layer 0 (S501) and before the automatic adjustment of the focus bias of the layer 1 (S503).

On this occasion, the optimal focus bias for the layer 1 is not set yet, and hence, the pull-in of the focus servo action is effected at a point at which a focus error level considered standard becomes nearly 0.

In this regard, some optical disks have a focus error signal characteristic optically exhibiting an offset in the layer 1 as shown in FIG. 9A by way of example. Even in such a disk, after the automatic adjustment of the focus bias, the focus servo action can be pulled in at a point as shown at Pb in FIG. 9B by way of example, and hence, the layer jump can succeed. At the layer jump process (S502) before setting the optimal focus bias, however, the focus servo action is pulled in at a point as shown at Pc in FIG. 9C. In this case, the pull-in point is near to the limit of a range in which the pull-in is possible (a bold line part in FIG. 9C), so that the layer jump sometimes fails without pulling in the focusing.

An object of the present invention is to provide techniques which can reliably effect the layer jump even before the adjustment of the focus bias.

In order to solve the above problem, a focus control apparatus according to the present invention comprises:

an objective lens which focuses light on an optical disk having a plurality of signal recorded layers;

focus drive means for moving the objective lens in a direction orthogonal to the recorded layers of the optical disk;

photodetection means for detecting reflected light from said optical disk;

focus-error-signal generation means for generating a focus error signal which corresponds to defocusing of said objective lens relative to any of said recorded layers of said optical disk, on the basis of a detection signal of said photodetection means;

recorded-layer movement control means for generating a signal which controls said focus drive means, on the basis of the error signal, in order to move the recorded layer on which said objective lens is to be focused; and focus pull-in means for pulling in the focus of said objective lens onto said recorded layer on which said objective lens is to be focused, said pull-in means being permitted to switch ON/OFF by said recorded-layer movement control means;

wherein said recorded-layer movement control means calculates an intermediate value from a maximum value and a minimum value of said focus error signal corresponding to the certain recorded layer; and in case of moving the focused position of said objective lens to said recorded layer, said focus pull-in means is turned ON when said focus error signal has corresponded to the intermediate value.

Herein, the intermediate value need not be a strict one, but if it lies in the vicinity of the central point of an error level waveform, the object of the present invention can be satisfactorily accomplished.

Besides, a layer jump control method for an optical disk having a plurality of signal recorded layers, according to the present invention, consists in:

that an intermediate value is obtained from a maximum value and a minimum value of a focus error signal which a certain one of the recorded layers generates, and that, at a layer jump to the recorded layer, a focus servo action is pulled in when the focus error signal has corresponded to the intermediate value.

BRIEF DESCRIPTION OF THE DRAWINGS

FIG. 8 is a flow chart for explaining a prior-art process for setting focus biases.

BEST MODE FOR CARRYING OUT THE INVENTION

Figure 1:
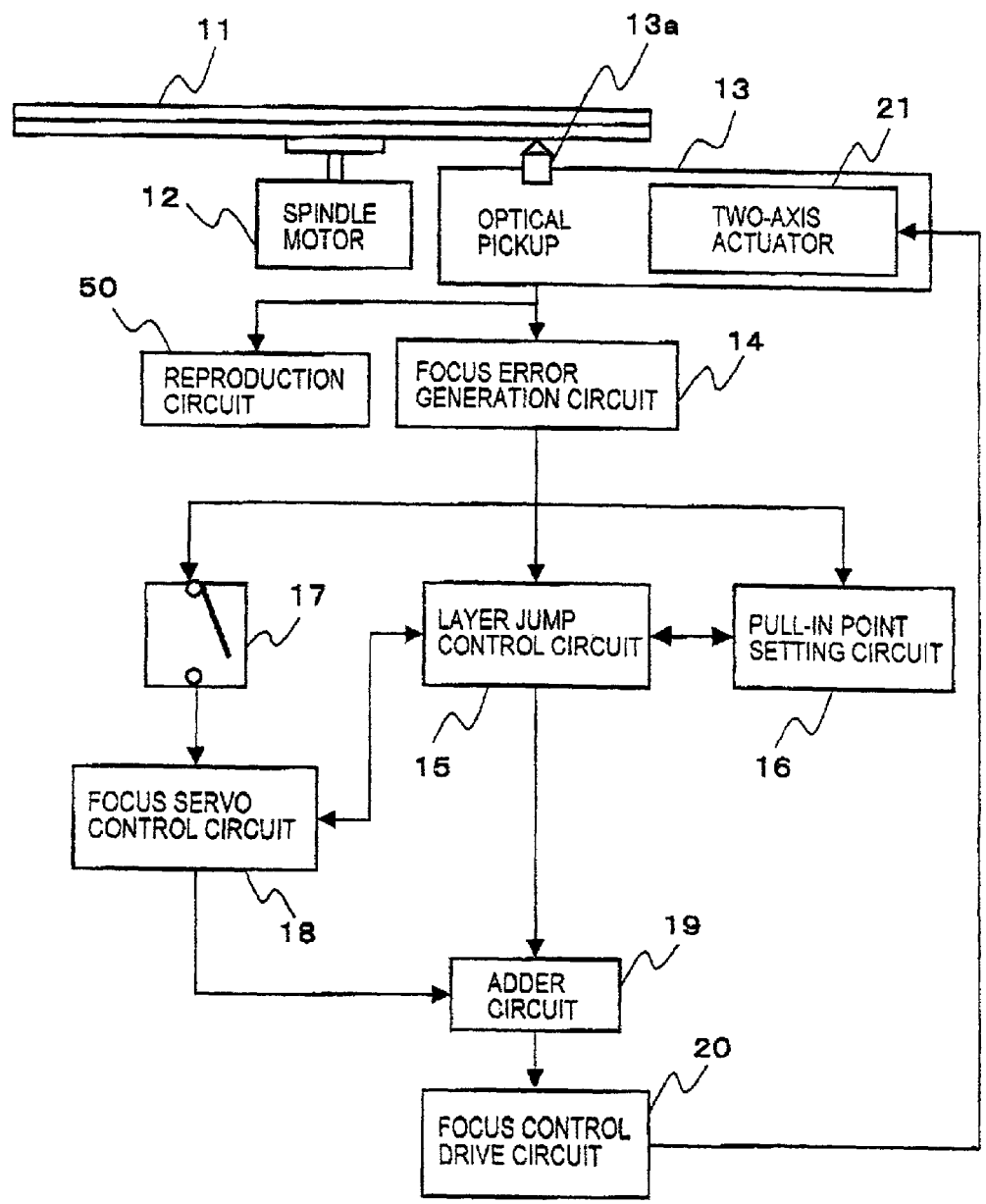
FIG. 1 is a block diagram showing the focus control mechanism of a multilayer optical recording disk playback system.

An embodiment of the present invention will be described with reference to the drawings. FIG. 1 is a block diagram showing the focus control mechanism of a multilayer optical recording disk playback system. In the multilayer optical recording disk playback system, an optical disk 11 having a multilayer recording structure, for example, DVD is driven to rotate at a predetermined speed by a spindle motor 12, while a laser beam is emitted from an optical pickup 13 and is focused on any recorded layer of the optical disk 11 by an objective lens 13a. Besides, light reflected from the recorded layer is read by the optical pickup 13. Part of the read optical signal is converted into an electric signal, which is inputted to a focus error generation circuit 14. The focus error generation circuit 14 generates a focus error signal from the converted electric signal. Here, the focus error signal can be generated, for example, in such a way that the light receiving section of the optical pickup 13 is provided with a quadrant photodetector element, which amplifies the difference of upper, lower, right and left photodetector element outputs by the astigmatic method.

In addition, the signal read by the optical pickup 13 is converted into an electric signal (RF signal), which is inputted to a reproduction circuit 50. The reproduction circuit 50 reproduces voice data, image data, etc. on the basis of digital signals recorded on the recorded layer of the optical disk. Incidentally, the reproduction circuit 50 is also capable of reproducing an optical disk of single-layer structure.

The focus error signal generated by the focus error generation circuit 14 is inputted to a layer jump control circuit 15 and a pull-in point setting circuit 16.

The layer jump control circuit 15 controls layer jump process in the case where, in a state in which a focus servo action is proceeding on a certain recorded layer of the optical disk, a request has been made for the movement of the focusing to another recorded layer. More specifically, upon the request for the movement to the other recorded layer, a switch 17 is actuated to turn OFF a focus servo. Thereafter, while the focus error signal from the focus error generation circuit 14 is being monitored, a signal for driving the objective lens 13a is outputted to an adder circuit 19. Besides, when the layer jump has been completed, the switch 17 is actuated to turn ON the focus servo.

The pull-in point setting circuit 16 calculates the pull-in point of the focus servo action at the time of the layer jump from the waveform of the focus error signal. The detailed process of the pull-in point setting circuit 16 will be explained later.

A focus servo control circuit 18 is constituted by a focus-bias automatic adjustment circuit, a gain adjustment circuit, a phase compensation circuit, an amplifier circuit, etc., and it executes the focus servo process in which a control signal to be applied to a focusing coil (refer to FIG. 5) is generated so that the inputted focus error signal may become a reference level. That is, the focus servo control circuit 18 executes the process which copes with the so-called "surface oscillation" of the optical disk 11 during the rotation thereof, etc. and causes the focused position of the laser beam to continually follow up a signal recorded surface. The focus servo control circuit 18 has the ON/OFF of the focus error signal input controlled by changing-over the switch 17.

The adder circuit 19 adds up objective lens 13a drive signals from the focus servo control circuit 18 and the layer jump control circuit 15, and outputs the resulting sum to a focus control drive circuit 20.

The focus control drive circuit 20 generates a voltage for driving the objective lens 13a as corresponds to the inputted control signal, and it supplies the voltage to a two-axis actuator 21.

Incidentally, the processes of the respective circuits stated above may well be implemented by software. Such a program, for example a driver program, may be on the market in such a form that the program is recorded on a storage medium, for instance an optical disk.

The two-axis actuator 21 actuates and drives the objective lens 13a of the optical pickup 13 in the two directions of the focusing direction of the objective lens and the radial direction of the optical disk.

Figure 2:
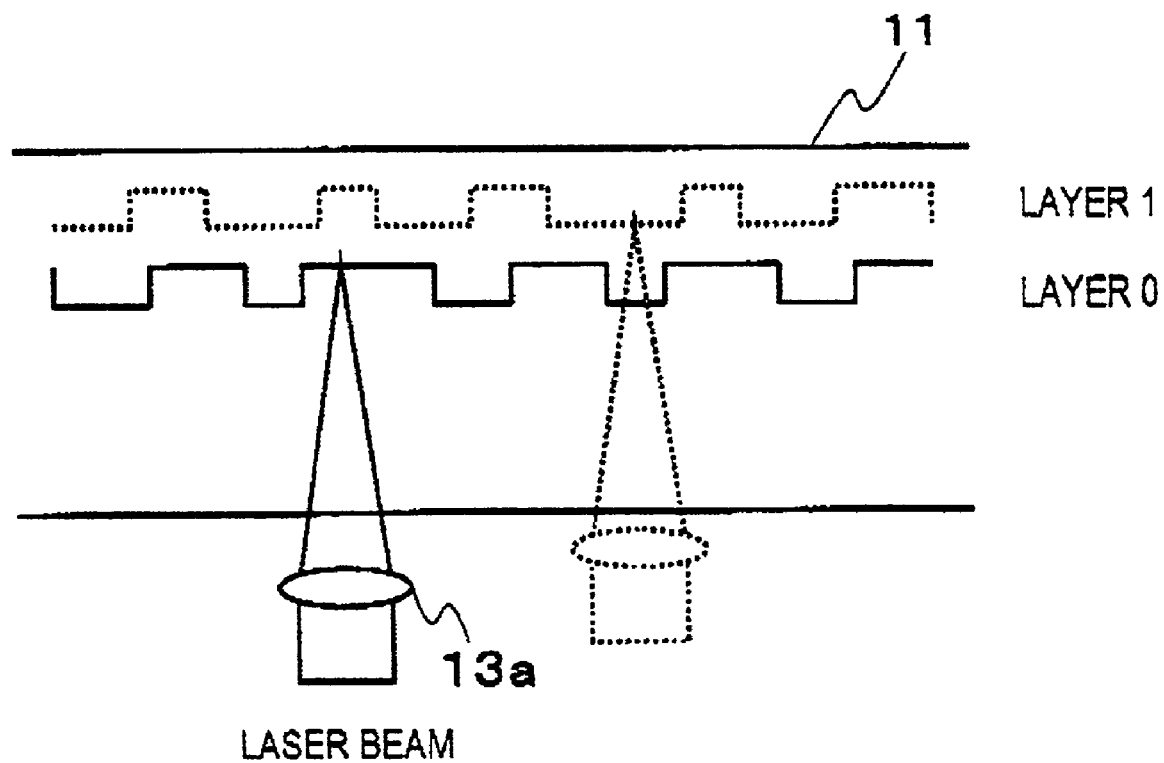
FIG. 2 is an explanatory diagram for explaining the construction of a multilayer optical recording disk.

In this example, the multilayer optical recording disk is of a double-layer structure having two recorded layers as shown in FIG. 2, and the layer nearer to the objective lens 13a during the reproduction shall be called the "layer 0", while the layer remoter from the objective lens 13a shall be called the "layer 1". In the figure, the recorded layer indicated by a solid line is the layer 0, and the recorded layer indicated by a broken line is the layer 1. The outside dimensions of the multilayer optical recording disk are, for example, a diameter of 120 mm and a thickness of 1.2 mm equal to those of a CD-ROM. A DVD, however, has a structure in which two disks each being 0.6 mm thick are stuck together. Data can be recorded on at most 2 layers per side, and can be recorded on both the sides of the disk. The storage capacity of the disk is 4.7 Gbytes in case of single-side one-layer recording, 8.5 Gbytes in case of single-side two-layer recording, 9.4 Gbytes in case of both-side one-layer recording, and 17 Gbytes in case of both-side 2-layer recording. The track pitch of the disk is 0.74 μm, and the wavelength of a data reading laser for the disk is 650 nm. Incidentally, it is needless to say that the layer jump control according to the present invention is applicable, not only to the optical disk of the double-layer structure, but also to an optical disk of a layer structure having three or more layers.

Figure 3:
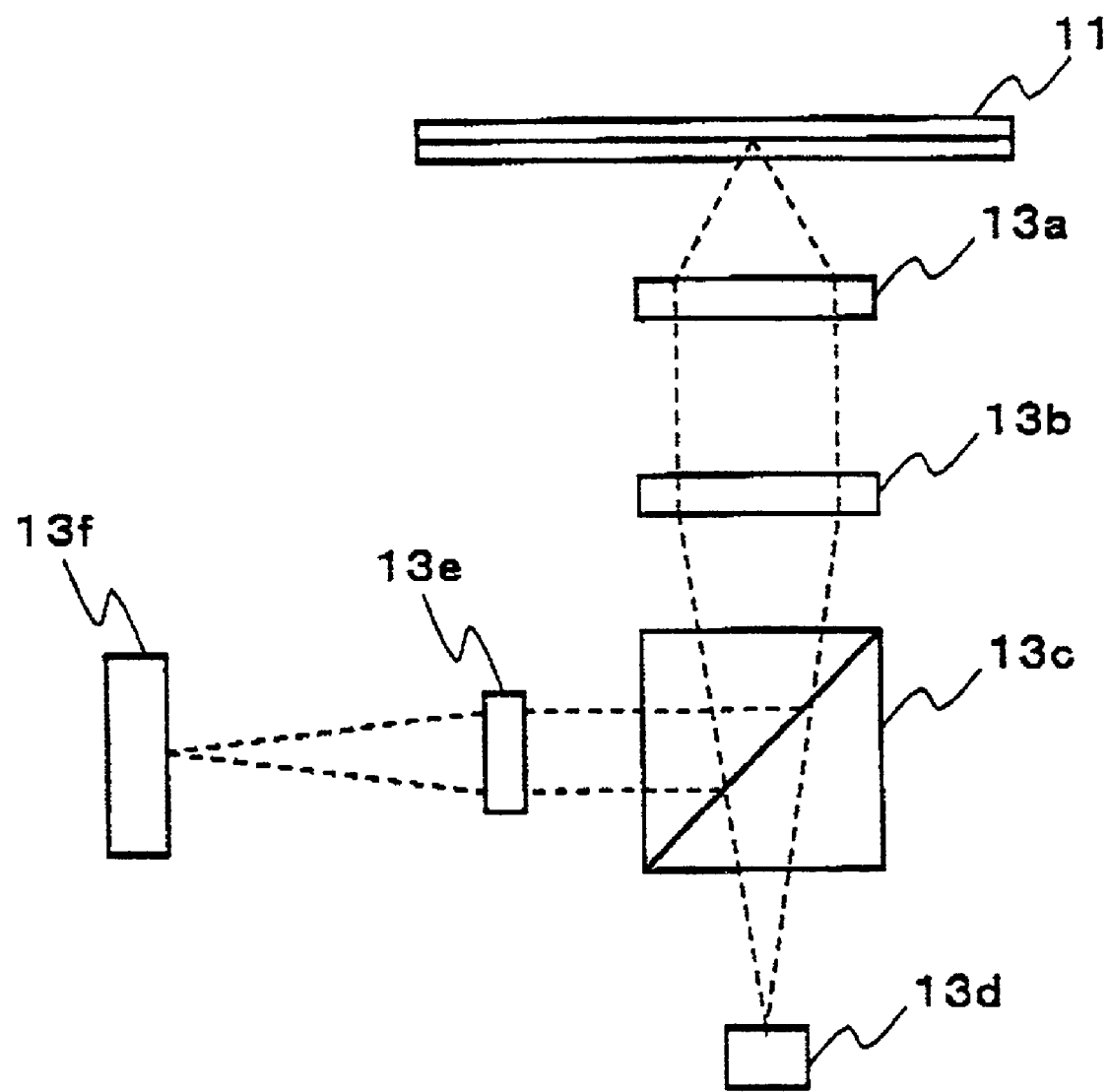
FIG. 3 is an optical path diagram for explaining the construction of an optical pickup.

The data is read from the optical disk 11 by the optical pickup 13. As shown in FIG. 3 by way of example, the optical pickup is configured of the objective lens 13a, a collimating lens 13b, a polarizing prism 13c, a semiconductor laser signal generator 13d, a cylindrical lens 13e, and a photodetector element 13f. A laser beam emitted from the semiconductor laser signal generator 13d rectilinearly propagates through the polarizing prism 13c and passes through the collimating lens 13b, and it is thereafter focused on any recorded layer of the optical disk 11 by the objective lens 13a. Light reflected from the optical disk 11 retrogresses through the objective lens 13a and passes through the collimating lens 13b, it is thereafter bent orthogonally by the polarizing prism 13c, and it thereafter enters the photodetector element 13f through the cylindrical lens 13e.

Figure 4:
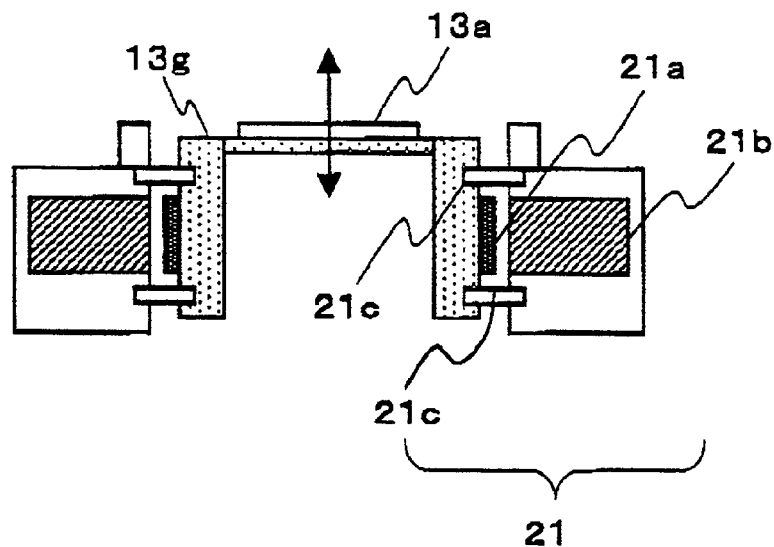
FIG. 4 is a sectional view showing the structure of a mechanism in which an objective lens is driven in its focusing direction by a two-axis actuator.

FIG. 4 is a mechanism diagram in which the objective lens 13a is driven in the focusing direction by the two-axis actuator 21. The objective lens 13a is supported by objective lens supporting springs 21c through an object lens fixture 13g so as to be freely displaced vertically and horizontally. The focusing coil 21a is disposed around the objective lens 13a, and a magnet 21b is further disposed outside. When the control signal is supplied to the focusing coil 21a, the objective lens 13a is given a driving force in the focusing direction as indicated by an arrow.

Figure 5:
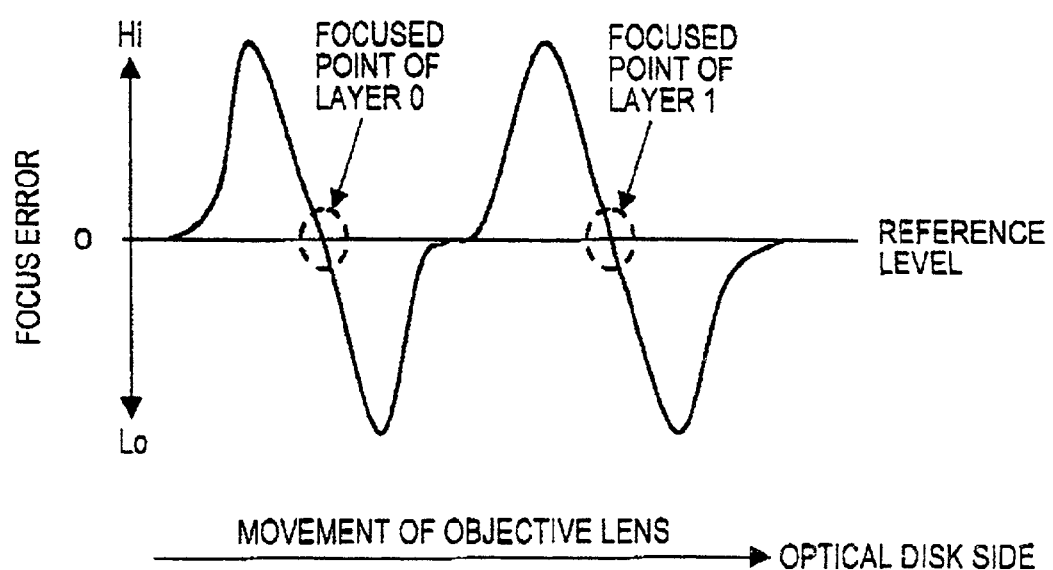
FIG. 5 is a waveform diagram of a standard focus error signal in the case where the objective lens has moved from a position remoter from a double-layer optical recording disk, to a position nearer to the optical disk.

FIG. 5 is a waveform diagram of a standard focus error signal in the case where the objective lens 13a has moved from a position remoter from the double-layer optical recording disk 11, to a position nearer to the optical disk 11. In the figure, the "focused point of layer 0" indicated by an arrow is the focused position of the lower layer (layer 0), while the "focused point of layer 1" is the focused position of the upper layer (layer 1). Here, the focus error levels of the focused point of the layer 0 and that of the layer 1 change depending upon optical characteristics, and they do not always agree with each other. By reference to the focus error signal voltage of zero, the upward direction shall be called the "Hi direction", and the downward direction the "Lo direction". Besides, the position at which the focus error signal voltage is zero is not always the optimal position for reading data, on account of the characteristics of the optical disk, etc. Therefore, the adjustments of focus biases are required in advance of the reproduction of the data.

Referring to the figure, when the objective lens 13a has started moving from the position remoter from the optical disk 11, the focus error signal, once forms a peak in the Hi direction and goes to the focused point of the layer 0 in the vicinity of the reference level reached. Thereafter, it forms a peak in the Lo direction, it passes through the reference level again, and it forms a peak in the Hi direction. Besides, it goes to the focused point of the layer 1 in the vicinity of the reference level subsequently reached. When the objective lens 13a moves to a position still nearer to the optical disk, the signal forms a peak in the Lo direction again.

Figure 6:
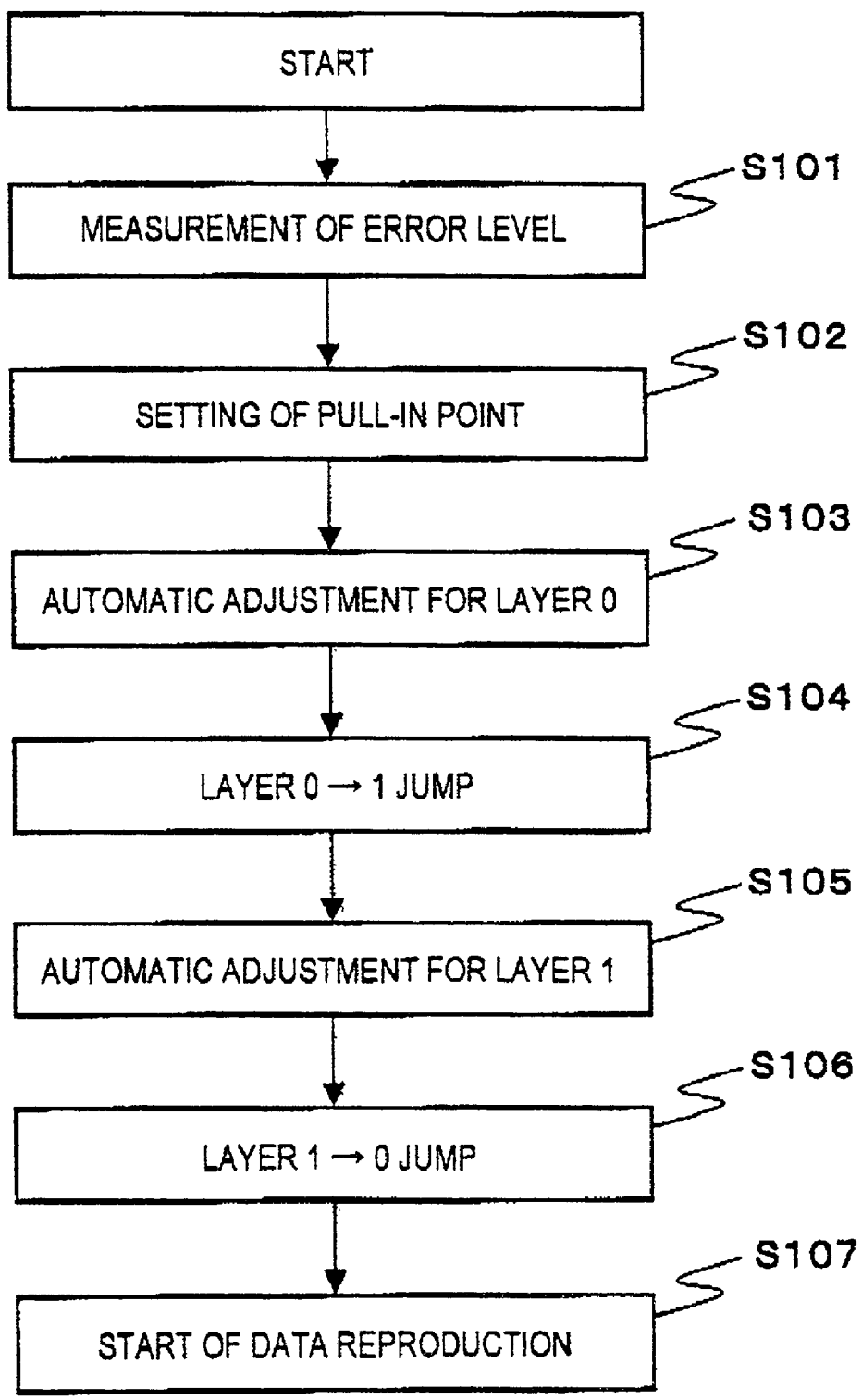
FIG. 6 is a flow chart for explaining the processing operation of the layer jump control mechanism in this embodiment.

The processing operation of the layer jump control mechanism in this embodiment, constructed as stated above, will be described with reference to a flow chart shown in FIG. 6.

This process is started with trigger being such a condition that the optical disk 11 is loaded, that a power source is turned on in the state where the disk is loaded, or that an optical-disk playback instruction is accepted from a user. In this manner, the process is executed every optical disk or every playback, whereby it is permitted to cope with discrepancies in the characteristics of optical disks, changes in a service environment, etc.

Figure 7:
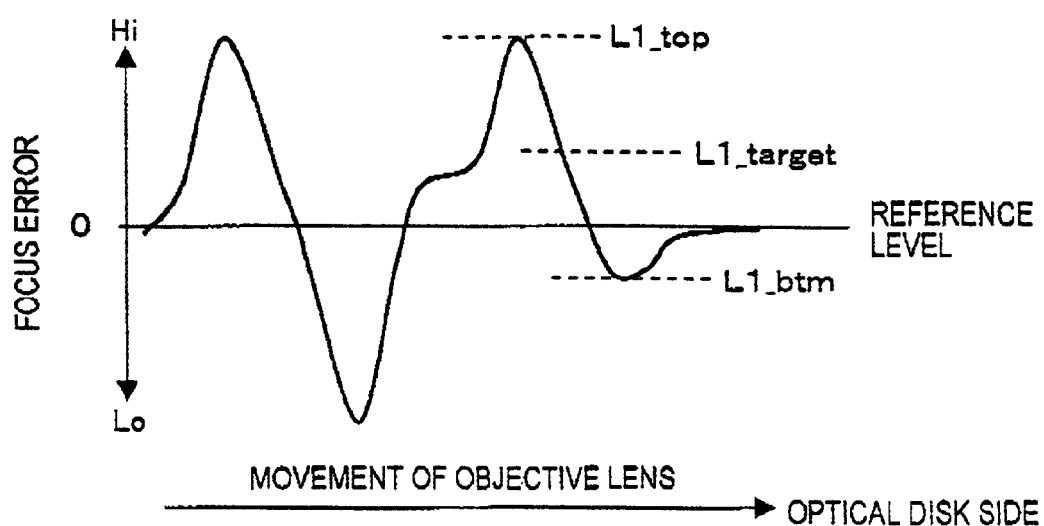
FIG. 7 is an explanatory diagram for explaining a process in which a pull-in point is set on the basis of the waveform of a focus error signal.
Figure 9A:
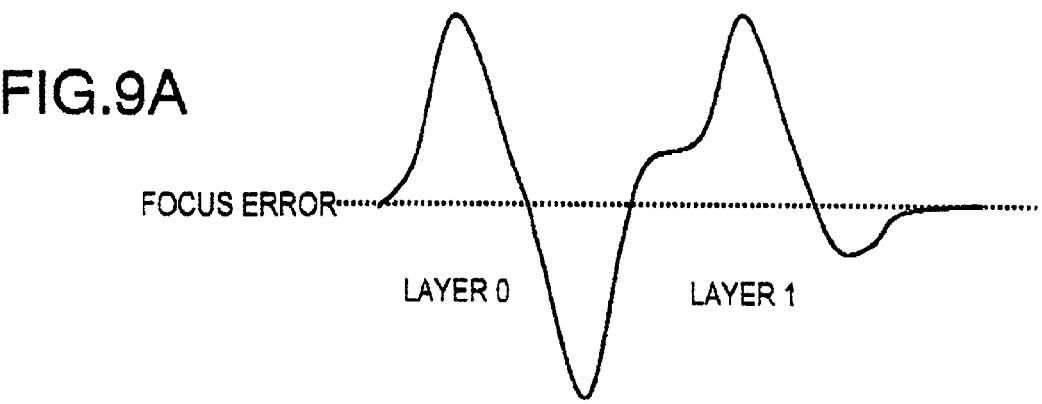
FIGS. 9A to 9C are explanatory diagrams for explaining the relationship between a focus error signal characteristic and the pull-in of a focus servo action.
Figure 9B:
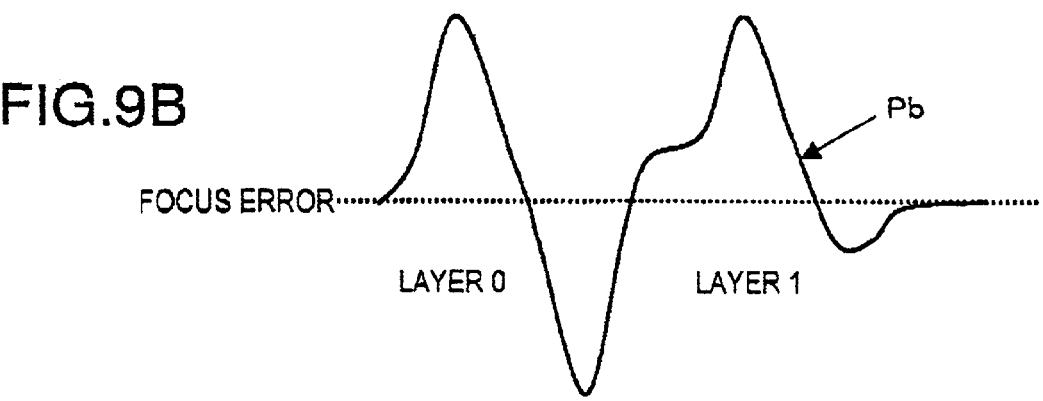
Figure 9C:
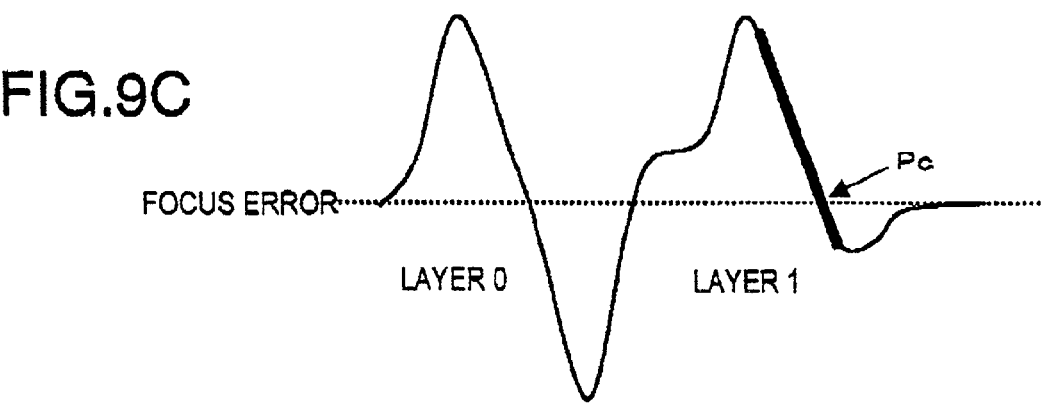

First, the layer jump control circuit 15 executes a focus-error-level measurement process (S101). The focus-error-level measurement process is executed in such a way that a focus error signal is observed while the objective lens 13a is being moved from a remoter position to a nearer position relative to the optical disk 11. An example of a focus error signal waveform obtained on this occasion is shown in FIG. 7.

The pull-in point setting circuit 16 sets the pull-in point of the focus servo action on the basis of the focus error signal waveform (S102). Concretely, the maximum error level (L1_top) and minimum error level (L1_btm) of the layer 1 in the focus error signal waveform shown in FIG. 7 are obtained. Besides, a level L1_target obtained by calculating the average value of the levels L1_top and L1_btm is set as the pull-in point of the focus servo action. That is, the pull-in point of the focus servo action becomes the central point of the error level waveform of the layer 1. This pull-in point, however, need not be strict. That is, if the pull-in point lies in the vicinity of the central point of the error level waveform, the object of the present invention can be satisfactorily accomplished.

When the pull-in point of the focus servo action for the layer 1 has been set, the focus servo is first turned ON for the layer 0, and the automatic adjustment of the servo for the layer 0 is performed, thereby to set the focus bias of the layer 0 (S103). Subsequently, when the automatic adjustment of the servo for the layer 0 has ended, the focus servo action is turned OFF, and a layer jump is made to the layer 1 (S104).

Concretely, the layer jump control circuit 15 sets the value of the focus bias at the pull-in point (L1_target) which has been set in the process S102. Besides, the circuit 15 outputs a signal for driving the objective lens 13a, and it turns ON the focus servo with the bias of the pull-in point (L1_target) while monitoring the focus error signal generated by the focus error generation circuit 14 (since the focus servo action is pulled in after the turn-ON of the focus servo, the timings of both the pull-in and the turn-ON are usually different).

Subsequently, the automatic adjustment of the servo for the layer 1 is performed, and a focus bias value after the automatic adjustment is set (S105).

After the automatic adjustment of the servo for the layer 1 has ended, a layer jump is made to the layer 0 (S106), and a process for reproducing data recorded on the optical disk is started (S107).

Incidentally, although the setting of the tentative bias value for the upper layer of the optical disk of the double-layer structure has been explained in the above example, the present invention is not restricted thereto, but it is also applicable to, for example, a case where a layer jump is made from the upper layer to the lower layer before the focus bias of the lower layer is set. Moreover, the present invention is applicable to an optical disk having a structure of three or more layers, by executing similar processes. Further, the pull-in point value of the focus servo action set in the foregoing process can be employed in case of making the layer jump, not only before the automatic adjustment of the focus bias, but also during the data reproduction.

In this manner, according to the present invention, the layer jump can be reliably effected even before the adjustment of the focus bias.

What is claimed is:

1. A focus control apparatus which controls a focus of an objective lens for focusing light against an optical disk having a plurality of signal recorded layers, comprising:
  focus drive means for moving the objective lens in a direction orthogonal to the recorded layers of the optical disk;
  photodetection means for detecting reflected light from said optical disk;
  focus-error-signal generation means for generating a focus error signal which corresponds to defocusing of said objective lens relative to any of said recorded layers of said optical disk, on the basis of a detection signal of said photodetection means;
  recorded-layer movement control means for generating a signal which controls said focus drive means, on the basis of the error signal, in order to move said objective lens for changing the recorded layer which is an objective of the focus of said objective lens; and focus pull-in means for pulling in the focus of said objective lens onto said recorded layer on which said objective lens is to be focused, said pull-in means being permitted to switch on and off by said recorded-layer movement control means;

wherein said recorded-layer movement control means calculates an intermediate value of said focus error signal from a maximum value and a minimum value of said focus error signal corresponding to said recorded layer; and in an automatic adjustment of a focus bias for each recording layer, said apparatus carries out processing of:

a) measuring a focus error signal of the optical disk;

b) calculating an intermediate value from a maximum value and a minimum value of the focus error signal in the recording layer which is a destination layer of the movement;

c) pulling in the focus of said objective lens onto the recorded layer which is an origin layer of the movement to carry out automatic adjustment of a focus bias;

d) moving the focus of said objective lens onto the destination layer and turning on the focus pull-in means when the focus error signal reaches to the intermediate value; and e) carrying out the automatic adjustment of the focus bias of the destination recording layer.

2. An optical disk playback system comprising a focus control apparatus which controls a focus of an objective lens for focusing light against an optical disk having a plurality of signal recorded layers, said focus control apparatus including:

focus drive means for moving the objective lens in a direction orthogonal to the recorded layers of the optical disk;

photodetection means for detecting reflected light from said optical disk;

focus-error-signal generation means for generating a focus error signal which corresponds to defocusing of said objective lens relative to any of said recorded layers of said optical disk, on the basis of a detection signal of said photodetection means;

recorded-layer movement control means for generating a signal which controls said focus drive means, on the basis of the error signal, in order to move said objective lens for changing the recorded layer which is an objective of the focus of said objective lens; and focus pull-in means for pulling in the focus of said objective lens onto said recorded layer on which said objective lens is to be focused, said pull-in means being permitted to switch on or off by said recorded-layer movement control means;

wherein in an automatic adjustment of focus bias for each recording layer in advance of playback of the optical disk, the apparatus carries out the following processing, and when the optical disk is played back, the apparatus moves the objective lens for changing the recording layer being the objective of the focus of the objective lens by using the automatically adjusted focus bias:

a) measuring a focus error signal of the optical disk;

b) calculating an intermediate value from a maximum value and a minimum value of the focus error signal in the recording layer which is a destination layer of the movement;

c) pulling in the focus of said objective lens onto the recorded layer which is an origin layer of the movement to carry out automatic adjustment of a focus bias;

d) moving the focus of said objective lens onto the destination layer of the movement and turning on focus pull-in means when the focus error signal reaches to the intermediate value; and e) carrying out the automatic adjustment of the focus bias of the destination recording layer.

3. A method of controlling a layer jump of an objective lens for an optical disk having a plurality of signal recorded layers, comprising the step of:

automatically adjusting a focus bias for each recording layer in advance of playback of the optical disk, said adjusting including the steps of:

measuring a focus error signal of the optical disk;

calculating an intermediate value from a maximum value and a minimum value of the focus error signal in the recording layer which is a destination layer of a layer jump;

pulling in the focus of said objective lens onto the recorded layer which is an origin layer of the layer jump to carry out automatic adjustment of a focus bias;

moving the focus of said objective lens onto the destination layer of the layer jump and turning on focus pull-in means when the focus error signal reaches to the intermediate value; and carrying out the automatic adjustment of the focus bias of the destination recording layer, and when the optical disk is played back, moving the focus of the objective lens onto the recording layer which is the destination layer of the layer jump by using the automatically adjusted focus bias.

4. A program product storing a program that is executable by an apparatus which plays back an optical disk having a plurality of signal recorded layers, in an automatic adjustment of a focus bias for each recording layer in advance of playback of the optical disk, said program causing said playback apparatus to execute the steps of:

measuring a focus error signal of the optical disk;

calculating an intermediate value from a maximum value and a minimum value of the focus error signal in a recording layer which is a destination layer of a layer jump;

pulling in the focus of an objective lens onto the recorded layer which is an origin layer of the layer jump to carry out the automatic adjustment of a focus bias;

moving the focus of said objective lens onto the destination recording layer of the layer jump and turning on focus pull-in means when the focus error signal reaches to the intermediate value;

carrying out the automatic adjustment of the focus bias of the destination recording layer, and when the optical disk is played back, said program causing the playback apparatus to carry out the step of moving the objective lens onto the recording layer which is the destination layer of the layer lump by using the automatically adjusted focus bias.

* * * * *